(No Model.)

E. F. HATHAWAY.
BICYCLE SUPPORT.

No. 456,411. Patented July 21, 1891.

Witnesses:
Robert Everett
J. A. Rutherford

Inventor:
Edgar F. Hathaway
By James L. Norris
Atty.

UNITED STATES PATENT OFFICE.

EDGAR F. HATHAWAY, OF HORNELLSVILLE, NEW YORK.

BICYCLE-SUPPORT.

SPECIFICATION forming part of Letters Patent No. 456,411, dated July 21, 1891.

Application filed May 2, 1891. Serial No. 391,415. (No model.)

*To all whom it may concern:*

Be it known that I, EDGAR F. HATHAWAY, a citizen of the United States, residing at Hornellsville, in the county of Steuben and State of New York, have invented new and useful Improvements in Bicycle-Supports, of which the following is a specification.

It is very desirable to provide a bicycle with simple and economical brace-arms controllable by a lever or levers in juxtaposition to the handle-bar or steering-post for the purpose of rendering the bicycle susceptible of standing in an upright position when not in use or when the rider desires to retain his seat when the machine is motionless. This has heretofore been accomplished by various contrivances, but all are more or less complicated, and, so far as I am aware, are of such construction and so applied as to require their combination with or application to the bicycle during the manufacture of the machine in the factory, and, moreover, a secondary lever is essential for the proper permanent attachment of the parts to secure perfect working action.

The object of my invention is to provide simple, efficient, economical, and practical means which can be readily and easily applied to bicycles already in use for the purpose of supporting the bicycle in an upright position when not in use or enable the rider to retain his seat while the machine is motionless, or to mount and pick up the supporting-braces after the machine has been started, or to mount and dismount while the machine remains stationary in an upright position. To accomplish this object my invention involves the features of construction and the combination or arrangement of devices hereinafter described and claimed, reference being made to the accompanying drawings, in which—

Figure 1:
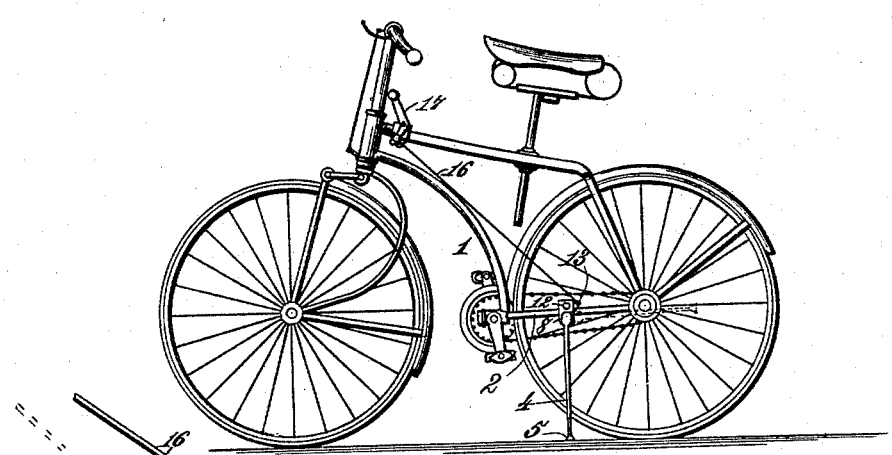
Figure 2:
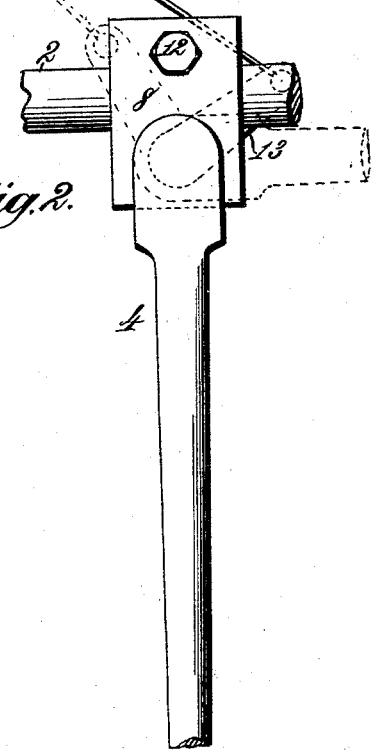
Figure 3:
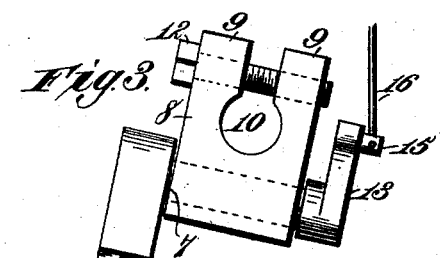
Figure 4:
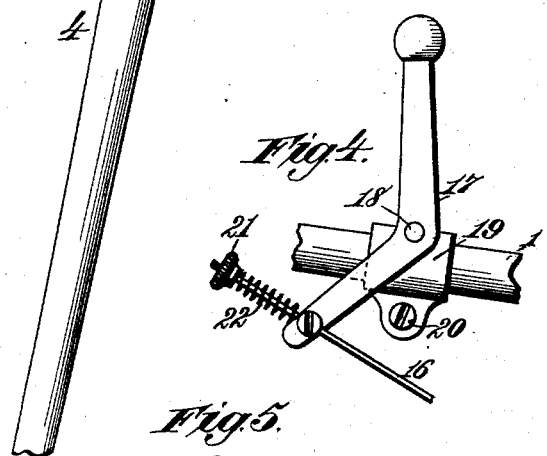
Figure 5:
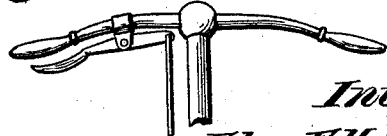

Figure 1 is a side elevation of a bicycle provided with my invention and showing the supporting-braces in position for holding the machine upright. Fig. 2 is a detail side elevation of a portion of the bicycle-frame, showing one of the supporting-braces clamped thereto. Fig. 3 is a rear elevation of the same. Fig. 4 is a detail view of a portion of the bicycle-frame, showing the brace-operating lever clamped thereto; and Fig. 5 is a detail view showing a modified arrangement of lever mechanism for operating the supporting-braces.

In order to enable those skilled in the art to make and use my invention, I will now describe the same in detail, referring to the drawings, where I have exhibited a Safety bicycle for the purpose of illustrating my improved mechanism; but obviously I do not confine myself to any particular construction of bicycle, as one of the essential and important advantages in my invention resides in the fact that the controllable supporting devices are adapted to be applied to and removed from bicycles of ordinary type now in use.

The numeral 1 indicates the frame of the Safety bicycle, comprising a horizontal arm 2 at each side of the rear driving-wheel 3, which frame supports the pedal mechanism by which motion is transmitted to propel the machine.

The numeral 4 indicates the supporting-brace, which is preferably composed of a rectilinear cylindrical rod having at its outer or free extremity a foot-piece 5, having a countersunk portion 6, which prevents it from sinking in soft ground. The inner extremity of the brace is provided with a shaft or axle 7, arranged at right angles thereto and journaled in a clip-block 8, which comprises a pair of clip-arms 9 and a circular cavity 10 to receive the cylindrical horizontal portion 2 of the bicycle-frame. The clip-arms 9 are connected together by a bolt 12, by which the two clip-arms can be pressed toward each other for the purpose of clamping the clip to the horizontal portion 2 of the bicycle-frame. To accomplish this with ease and facility the clip-arms should be elastic and the set-bolt removable and replaceable; but obviously other constructions will suggest themselves to those skilled in the art for the purpose of enabling the clip-block to clamped to a suitable portion of the frame of a bicycle already in use. The shaft 7 of the supporting-brace 4 extends entirely through the clip-block 8, and is provided at its inner extremity with a crank-arm 13, having at its outer portion a wrist-pin 15, to which is attached one end of a rod, wire, or other suitable connection 16, leading to a pivoted lever 17, located in such position that it can be conveniently operated by the rider for the purpose of manipulating the wire or connection 16 to rock the shaft 7, and thereby raise or lower the supporting-brace 4.

The lever 17 is pivoted at 18 to a clip 19, adapted to embrace and grip the uppermost horizontal portion of the bicycle-frame 1. The clip 19 is provided with a set bolt or screw 20, by which to cause it to grip or release the bicycle-frame for the purpose of removing and replacing the lever.

Instead of placing the lever 17 and its clamp 19 upon the frame of the bicycle, I may engage the lever-carrying clamp with the handle-bar of the steering-post, as in Fig. 5, whereby the supporting-braces can be operated, while the hands of the rider grasp the steering-bar in a manner somewhat similar to the operation of the usual bicycle-brake.

The important and essential features of my invention reside in the fact that the supporting-brace is carried by a clip-block to be applied to and removed from the bicycle-frame, while the actuating-lever is likewise carried by a clip adapted to be clamped upon the bicycle-frame or upon the steering-bar, whereby the bicycle-supporting mechanism can be applied to bicycles already in use.

An important feature of my invention is that the supporting-braces may be raised or lowered while the bicycle is in motion, thus enabling the rider to mount and raise the braces after the machine has been started.

The invention is particularly well adapted for machines used by ladies, as it will permit them to mount and dismount while the machine remains motionless.

The rod, wire, or other connection 16 extends through an orifice in the lower end of the lever 17 and is provided with an adjustable nut or other suitable head 21, between which and the lever is arranged a coiled or other spring 22 in such manner that when the upper end of the lever is drawn rearward for the purpose of lifting the brace 4 the lower extremity of such lever compresses the spring and rises above the horizontal plane of the pivot 18, whereby the parts are locked in position, and the spring operates to retain the brace in the position indicated by dotted lines, Fig. 1.

What I claim is—

1. A bicycle-support consisting of a clip-block adapted to be clamped to a bicycle-frame, a swinging supporting-brace having a shaft or axle journaled in the clip-block and provided with a crank-arm, and an actuating-lever provided with a clip adapted to be clamped to a part of the bicycle and having a rod or other connection with the crank-arm, substantially as described.

2. The combination, in a bicycle-support, of a clip-block having elastic clip-arms to receive a part of the bicycle, a set bolt or screw for pressing the clip-arms toward each other and thereby clamping the clamp-block in a fixed position, a swinging supporting-brace having a shaft or axle journaled in the clip-block and provided with a crank-arm, an actuating-lever carried by a clip, provided with a set bolt or screw for clamping it to a part of the bicycle, and a rod or other suitable connection between the actuating-lever and the crank, substantially as described.

In testimony whereof I have hereunto set my hand and affixed my seal in presence of two subscribing witnesses.

EDGAR F. HATHAWAY. [L. S.]

Witnesses:
ALBERT H. NORRIS,
ELIZABETH HATHAWAY.